United States Patent [19]
Eufusia

[11] 3,747,634
[45] July 24, 1973

[54] SERVO SYSTEM WITH ELECTRICALLY OPERATED VALVE FOR MAINTAINING A CONSTANT PRESSURE

[75] Inventor: Eugene A. Eufusia, Santa Rosa, Calif.

[73] Assignee: Optical Coating Laboratories, Inc., Santa Rosa, Calif.

[22] Filed: Mar. 23, 1972

[21] Appl. No.: 237,495

Related U.S. Application Data

[60] Continuation of Ser. No. 54,730, July 14, 1970, abandoned, which is a division of Ser. No. 781,150, Dec. 4, 1968, Pat. No. 3,596,873.

[52] U.S. Cl. .......................................... 137/487.5
[51] Int. Cl. .............................................. F16k 31/02
[58] Field of Search .................... 137/487.5, 14; 251/138, 141, 139, 140

[56] References Cited
UNITED STATES PATENTS

| | | | |
|---|---|---|---|
| 3,168,242 | 2/1965 | Diener | 251/129 X |
| 3,256,900 | 6/1966 | Estes et al | 251/140 X |
| 3,464,438 | 9/1969 | Maurer | 137/487.5 |

Primary Examiner—Henry T. Klinksiek
Assistant Examiner—Robert J. Miller
Attorney—Harold C. Hohbach et al.

[57] ABSTRACT

A servo system with electrically operated valve for maintaining a constant pressure in a chamber in which the valve is mounted on the chamber to precisely control the rate of flow into the chamber and having monitoring means adapted to be mounted on the chamber for monitoring the pressure in the chamber. An error amplifier is provided for comparing the monitor pressure with the reference and supplies an error signal to the electrically operated valve to change the rate of metering of fluid into the chamber.

3 Claims, 3 Drawing Figures

INVENTOR.
Eugene A. Eufusia

SERVO SYSTEM WITH ELECTRICALLY OPERATED VALVE FOR MAINTAINING A CONSTANT PRESSURE

CROSS-REFERENCE TO RELATED APPLICATION

This is a Continuation of application Ser. No. 54,730, filed July 14, 1970 now abandoned, which is a divisional application of Ser. No. 781,150, filed Dec. 4, 1968, now U.S. Pat. No. 3,596,873.

BACKGROUND OF THE INVENTION

Valve assemblies and servo systems incorporating the same have heretofore been provided, however they have had a number of disadvantages. For example, in a certain type, the response time was very slow. Another type had a very narrow pressure control range and required manual adjustments in order to increase the range. In addition the needle valve had only two positions, an open position and a closed position. There is therefore a need for a new and improved valve assembly and servo system incorporating the same.

SUMMARY OF THE INVENTION AND OBJECTS

The valve assembly consists of a housing. A needle seat is carried by the housing and has an opening therein. A coil is provided which carries a needle valve. Means is provided in the housing which forms a magnetic field about the coil and yieldable means normally retains the coil and needle valve carried thereby in a predetermined position with respect to the needle valve seat. Means is also provided for supplying a current to the coil to move the needle valve from the predetermined position to precisely meter fluid passing through the valve seat.

When the valve assembly forms a part of the servo system, a reference is provided and electronic means is connected to the reference and to the valve assembly to cause fluid to be metered by the valve assembly in accordance with the reference. The servo means includes error compensating means for compensating for any error in the fluid flow metered by the valve assembly.

In general, it is an object of the present invention to provide a valve assembly which can be utilized for precisely metering fluids.

Another object of the invention is to provide a valve assembly of the above character in which the needle valve can be precisely positioned in positions between extreme opened and closed positions of the needle valve with respect to the needle valve seat.

Another object of the invention is to provide a valve assembly of the above character in which the needle valve is precisely positioned by the use of a current flowing through a coil.

Another object of the invention is to provide a servo system incorporating the valve assembly which has a very fast response time.

Another object of the invention is to provide a servo system of the above character which has a wide pressure control range.

Additional objects and features of the invention will appear from the following description in which the preferred embodiments are set forth in detail in conjunction with the accompanying drawings.

DESCRIPTION OF THE PREFERRED EMBODIMENT

Figures 1, 2:
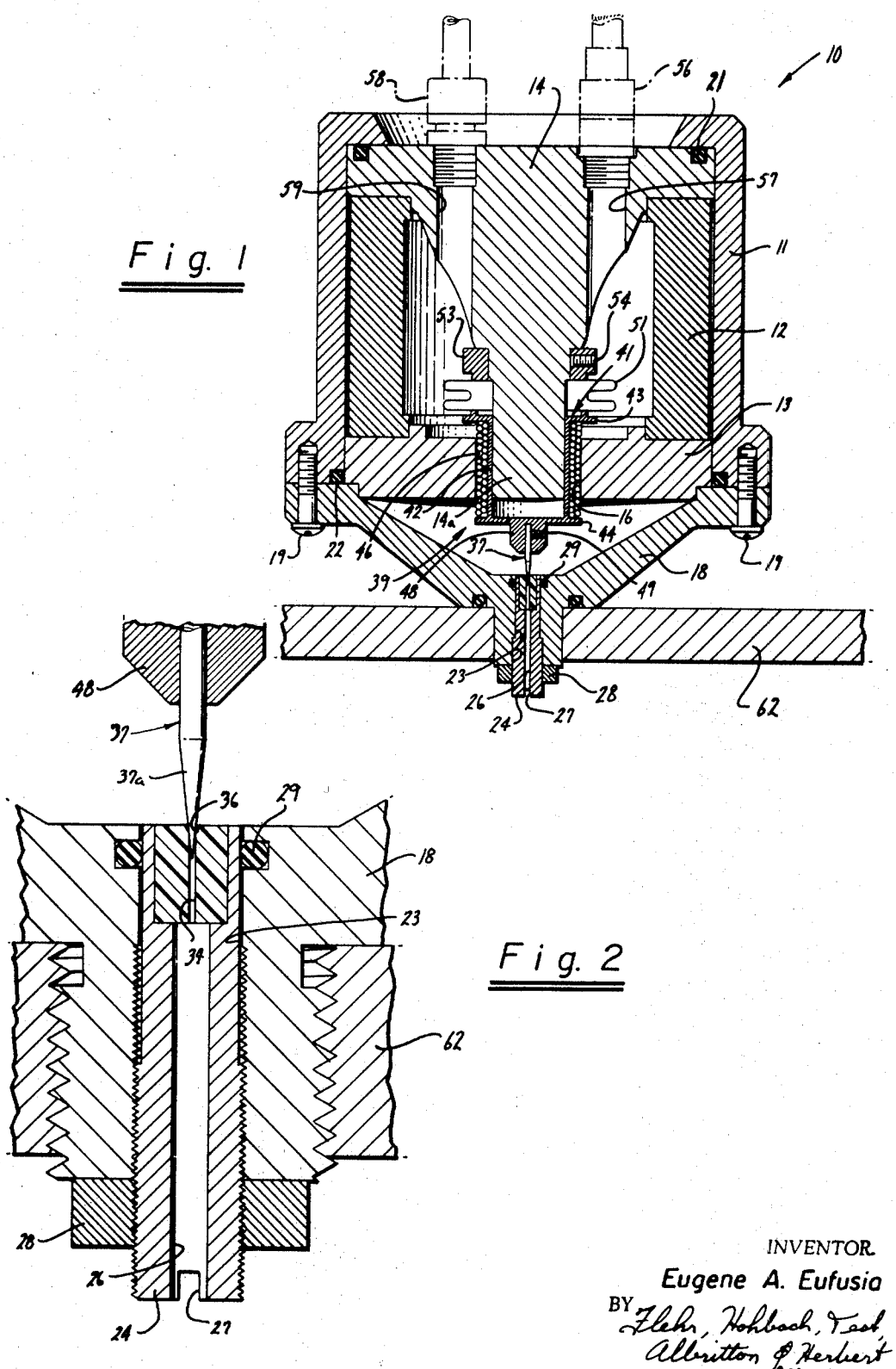
FIG. 1 is a cross-sectional view of a valve assembly incorporating the present invention.
FIG. 2 is an enlarged cross-sectional view of the portion of the vqlve assembly shown in FIG. 1.

The valve assembly 10 as shown in FIGS. 1 and 2 consists of a cylindrical valve housing 11. A cylindrical permanent magnet 12 of a suitable material such as Alnico is disposed within the housing. A circular female or bottom pole piece 13 engages the lower extremity of the permanent magnet 12 and a male or top pole piece 14 engages the top of the permanent magnet 12. The female pole piece 13 is provided with a centrally disposed hole 16 through which an extension 14a of the male pole piece extends. The diameter of the outer extremity of the extension 14a is substantially less than the diameter of the hole 16 in the female pole piece 13 so that an air gap is provided through which magnetic lines of flux pass as established by the permanent magnet 12 traveling through the soft iron pole pieces 13 and 14.

The magnet 12 and the pole pieces 13 and 14 are held in place within the housing 11 by a disc shaped cover plate 18 which has outer margins secured to the valve housing 11 by suitable means such as screws 19. Means is provided for establishing a seal between the valve housing 11 and the pole pieces 13 and 14 and consists of O-rings 21 and 22.

A bore 23 is provided in the cover plate 18 and has a valve seat holder 24 threaded therein. The valve seat holder is provided with a bore 26 extending longitudinally of the same and in addition is provided with the tool receiving slot 27 which can be utilized for positioning the valve seat holder. The valve seat holder is locked in the desired position by a lock nut 28 which is threaded onto the valve seat holder 24 and engages the cover plate 18. Sealing means in the form of an O-ring 29 establishes a seal between the upper extremity of the valve seat holder 24 and the cover plate 18. A valve seat insert 31 formed of a suitable material such as Teflon is mounted in the holder 24 and is provided with a relatively small bore 34 which extends longitudinally of the same and which opens through a conical valve seat 36.

A very small needle valve 37 is adapted to be moved between open and closed positions with respect to the valve seat 36 and is formed of a suitable material such as steel. The needle valve is provided with a very finely ground tapered pin portion 37a adapted to form a sealing engagement with the valve seat 36.

The needle valve 37 is carried by a force coil assembly 39 consisting of a bobbin 41 formed of a suitable material such as aluminum. The bobbin is formed by a cylinder 42 which is open at one end and which is of a size which is adapted to receive the extension 14a of the male pole piece. The bobbin is provided with radially extending upper and lower flanges 43 and 44 between which is wound a coil 46. A boss is mounted on the lower extremity of the cylinder 42 and is centrally disposed thereon. The needle valve 37 is mounted in the boss 48 and is held therein by a set screw 49.

Means is provided for yieldably retaining the bobbin 41 on the needle valve 37 carried thereby in a predetermined position as for example a closed position with respect to the valve seat 36 and consists of a spring-like beryllium copper bellows 51 which is secured to the bobbin 41 by suitable means such as a press fit. The top side of the bellows 51 is secured to a mounting member 53 which is secured to the extension 14a by set screw 54.

Means is provided as hereinafter described for supplying a current to the coil 46 carried by the bobbin 41 which is connected by wires (not shown) extending through the fitting 56 threaded into a bore 57 provided in the male pole piece 14. Means is also provided for supplying the fluid which is to be metered by the valve assembly to the valve assembly through a fitting 58 which is threaded into a bore 59 that also extends through the male pole piece 14. The flow is adapted to pass through the bore 59 to an inner space 61 and thence through the air gap between the male pole piece 14 and the famel pole piece 13 and down through the opening 34 in the valve seat insert 31.

The valve assembly 10 is adapted to be mounted in the side wall 62 of a chamber into which the fluid is to be metered. As shown particularly in FIG. 2, the cover plate 18 is threaded into the side wall 62.

Figure 3:
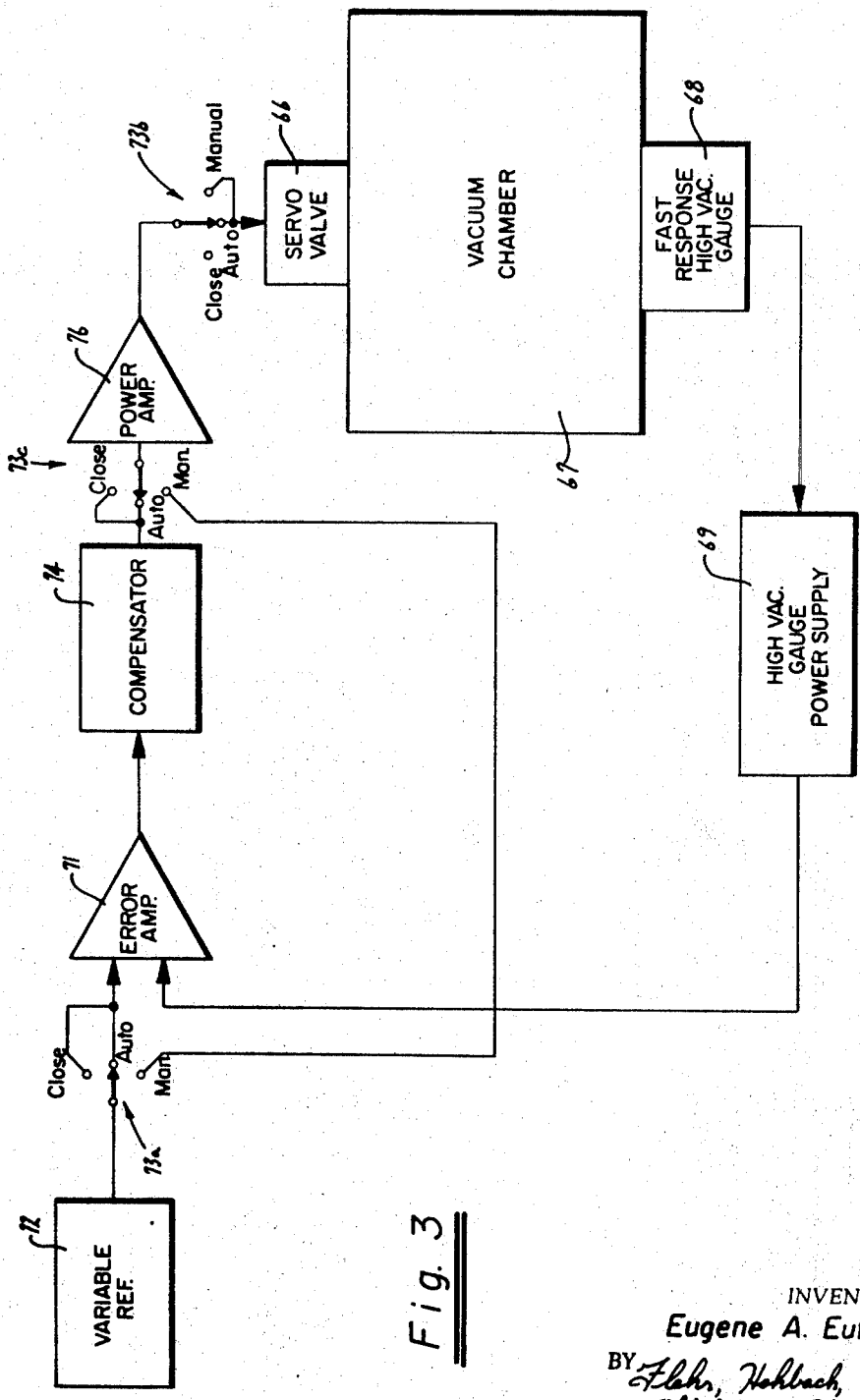
FIG. 3 is a block diagram of a servo system incorporating the valve assembly.

As shown in FIG. 3, the valve assembly can be incorporated in a servo system in which the valve assembly serves as a servo valve 66 mounted in the wall of a vacuum chamber 67 to be utilized to supply gases to the vacuum chamber to hold the pressure in the vacuum chamber at a constant value. A fast response, high vacuum gauge 68 of a conventional type is provided on the vacuum chamber for monitoring the pressure in the vacuum chamber and supplies its output to a power supply 69. The output of the power supply is connected to one input of an error amplifier 71. A variable reference 72 is provided which supplies a reference voltage to the other input of the error amplifier 71. The error amplifier 71 compares the two voltages. A switch 72 is provided with three poles 73a, 73b and 73c for selecting either "close", "automatic" or "manual" operation of the system.

The output of the error amplifier 71 is supplied to a compensator network 74 of a conventional type that is provided for compensating the servo system to the vacuum chamber being utilized. The output of the compensator network 74 is supplied to a power amplifier 76 which is adapted to be connected to the servo valve 66 through switch 73.

Operation of the valve assembly and the servo system incorporating the valve assembly may now be briefly described as follows. Let it be assumed that the servo system and the valve assembly are utilized in conjunction with a vacuum chamber in which it is desired to maintain or hold a predetermined pressure, i.e., to maintain the pressure in the vacuum chamber at a constant value. The chamber 67 is continuously being pumped with vacuum pumps of the desired size and the gas is being bled into the chamber 67 to maintain the pressure at the desired pressure. Any gas, as for example oxygen, air, nitrogen, can be utilized. Let it be assumed that the switch 73 has been set to the automatic position and that a predetermined pressure has been selected by adjusting the variable reference 72 to provide a predetermined voltage. Assuming that this pressure is greater than the pressure within the chamber 67, an error signal will be created by the error amplifier when it compares the output from the power supply 69 and the reference 72 to supply current to the servo valve 66. This causes the bobbin 41 and the needle valve 37 carried thereby to be moved away from the valve seat 36 to permit additional fluid to flow past the valve seat to the passage 34 to increase the pressure.

When the current in coil 46 is zero, the needle valve is maintained in closed position by the bellows 51 urging the needle valve downwardly as viewed in FIG. 1. The valve assembly can be preset so that a predetermined current is required for the needle valve to be moved from the closed position. for example, it can be preset for a predetermined current ranging from 0 to 500 milli-amperes. Let it be assumed that the valve assembly has been preset for 100 milli-amperes by adjusting the valve seat holder 24 by the use of a screwdriver engaging the tool receiving slot 27 and positioning the valve seat holder 24 longitudinally of the plate 18. If it is assumed that the valve holder has been preset so that it requires 100 milli-amperes to move the needle valve to an open position with respect to the valve seat, then it can be seen from 0 to 100 milli-amperes current in the coil 46 no gas will be bled into the chamber 67. At 100 milli-amperes a very small amount of gas will be bled into the vacuum chamber. As the current in the coil creeps beyond 100 milli-amperes, gas bled into the vacuum chamber 67 varies approximately linearly as the current is varied until approximately 800 milli-amperes. It can be seen that a conventional power supply which will supply 0 to 800 milli-amperes at approximately 20 volts DC could be utilized for this valve assembly to obtain a manual bleed control in the vacuum chamber.

The force which moves the needle valve from the closed position is determined by the effect of the current flow within the coil 46 and the magnetic field created in the air gap by the permanent magnet 12 in co-operation with the pole pieces 13 and 14. This linearity in opening of the needle valve is obtained because of the co-action of the magnetic forces and the action of the bellows 51. It can be seen that as soon as a certain current is passing through the coil, a force is created and the needle moves to a greater open position until the force exerted by the bellows 51 equals the force exerted by the coil 46. The needle valve thus reaches an equilibrium position and does not shift any farther until the current flowing in the coil 46 changes.

It can be seen that because of this construction, the valve seat 36 is in effect adjusted with respect to the position of the bellows 51. The bellows has been utilized because it is more accurate than a spring and also it provides a mechanical mounting means for the coil which is superior to a spring.

Now let it be assumed that there is a rapid change in the pressure condition within the vacuum chamber 67. As soon as this change occurs, this is immediately detected by the high vacuum gauge 68 and this information is supplied to the error amplifier 71 which supplies an error signal to the servo valve 66. This changes the current flowing in the coil 46 and causes the valve to move slightly in the necessary direction to bring about the desired correction in the vacuum or pressure condition within the chamber 67. This continues until the desired pressure is reached within the vacuum chamber 67.

In construction of the valve assembly, the parts are made relatively large in comparison to the size of the needle valve. This is desirable in order to provide a high force on a low mass moving part to make possible a very fast response time.

By way of example, a valve assembly in a servo system utilized in conjunction with a vacuum system had the following characteristics. Utilizing a cold cathode gauge for measuring the pressure in the vacuum chamber 67, the range of pressures was from $10^{-5}$ torr to $10^{-3}$ torr. With the gain of the servo loop at a maximum, the accuracy was better than $\pm .1$ percent. For small chambers (30 inches in diameter) the response time (0 to 99 percent) was less than one second. For large chambers (120 inches in diameter) the response time (0 to 99 percent) was less than five seconds.

In addition to the automatic position hereinbefore described, a manual position is provided for the control switch 73. In addition a closed position is provided in which the servo loop is removed from the servo valve assembly 66 and the servo valve assembly automatically moves to its normally closed position.

It can be appreciated that even though only one valve assembly is utilized in connection with the chamber 67 that it is possible to utilize two or three valve assemblies to bleed or mix two or more different gases within the same chamber.

By way of example the moving parts of the valve assembly had a weight of approximately 10 gm. and the force which could be developed by the current flowing in the coil 46 was approximately 1 ½ pounds to make possible the very fast response time. It can be seen that the valve assembly is relatively simple in construction and is capable of a very precise metering of fluid flow through the valve assembly. It is relatively versatile and can be utilized for bleeding any fluid such as gas from a high pressure reservoir to a lower pressure reservoir.

I claim:

1. In a servo system for maintaining a constant pressure in a chamber, an electromagnetic valve assembly adapted to be mounted on said chamber for precisely controlling the rate of flow of a fluid into the chamber, monitoring means adapted to be mounted on the chamber for monitoring the pressure in the chamber and supplying an electrical output in analog form, a reference providing an electrical output in analog form, an electronic error amplifier, means connecting the output of the reference to the error amplifier, means connecting the output of of the monitoring means to the error amplifier, and electronic means connecting the output of the error amplifier to the electromagnetic valve assembly, said error amplifier comparing the output from the monitoring means with the output of the reference and supplying an analog error signal to the electromagnetic valve assembly which is used for changing the rate of metering of the fluid into the chamber.

2. A system as in claim 1 wherein said valve assembly comprises a housing, a needle valve seat carried by the housing and having an opening therein, a needle valve, a coil assembly carrying the needle valve, means mounted in the housing forming a magnetic field about the coil assembly, and yieldable means retaining said needle valve in a predetermined position with respect to said needle valve seat.

3. A system as in claim 1 wherein said electronic means includes a compensator.

* * * * *